Sept. 4, 1951 W. A. HUNTER 2,567,152
VALVE SYSTEM FOR HYDRAULIC TRANSMISSIONS
Filed April 9, 1947 2 Sheets—Sheet 1

INVENTORS.
William A. Hunter.
BY Harness and Harris
ATTORNEYS.

Sept. 4, 1951 W. A. HUNTER 2,567,152
VALVE SYSTEM FOR HYDRAULIC TRANSMISSIONS
Filed April 9, 1947 2 Sheets-Sheet 2
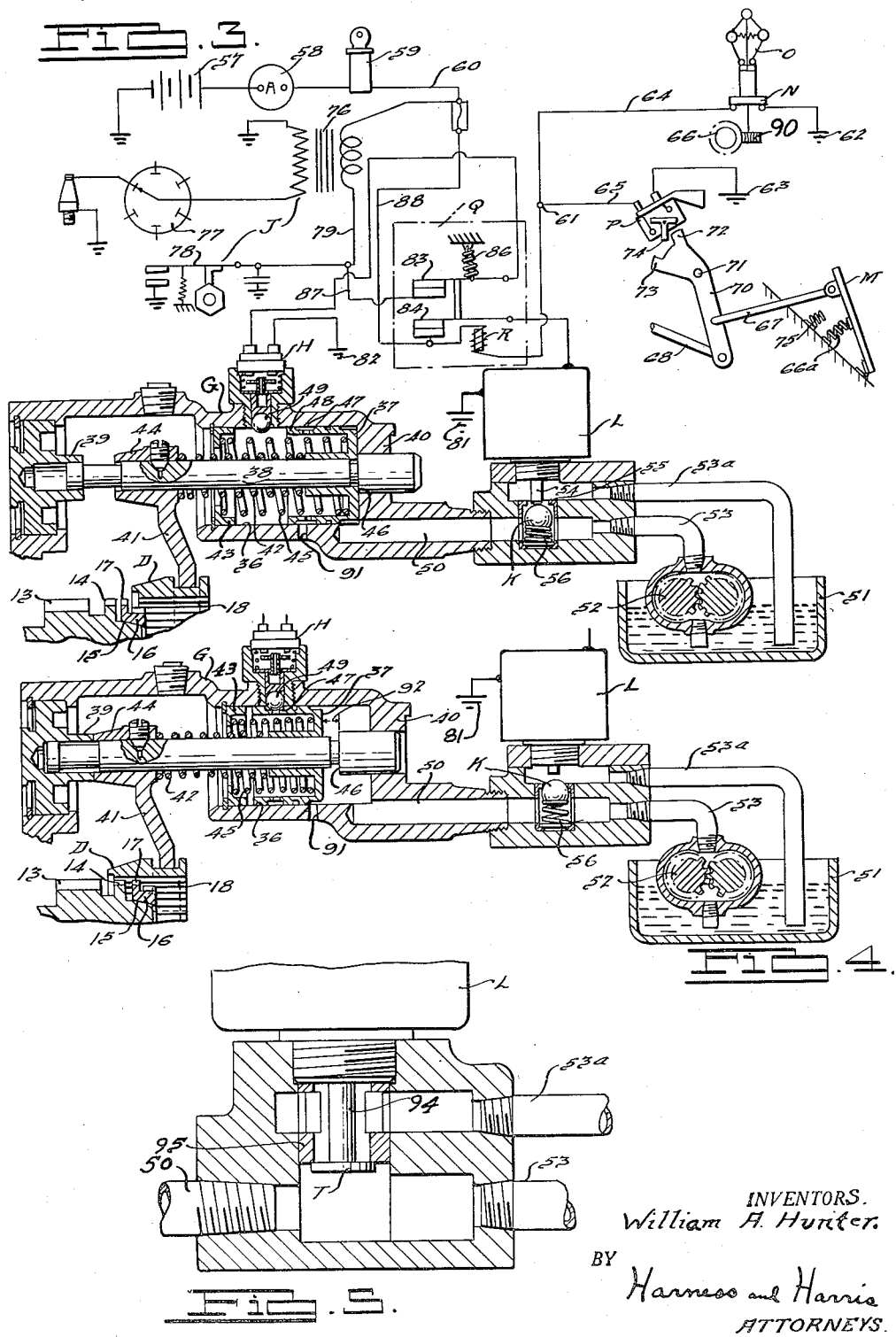
INVENTORS.
William A. Hunter.
BY
Harness and Harris
ATTORNEYS.

Patented Sept. 4, 1951

2,567,152

UNITED STATES PATENT OFFICE 2,567,152

VALVE SYSTEM FOR HYDRAULIC
TRANSMISSIONS

William A. Hunter, Highland Park, Mich., assignor to Chrysler Corporation, Highland Park, Mich., a corporation of Delaware Application April 9, 1947, Serial No. 740,425

15 Claims. (Cl. 74—336.5)

This invention relates to motor vehicles and refers more particularly to power transmission and control mechanism therefor.

My invention has particular reference to transmission systems in which the torque load is relieved as by momentary interruption of the engine ignition system, or by vehicle speed-responsive controls, in order to unload positively engageable drive control elements so as to facilitate disengagement of such elements. In such transmission systems it is now customary to provide a kickdown control on transmission downshift accompanied by ignition interruption such that when the accelerator pedal is depressed to the limit of its travel in throttle-opening direction then the downshift will automatically take place so as to accelerate the vehicle in a more favorable drive ratio as in passing another vehicle or in climbing a steep grade. It is also customary to provide a vehicle speed responsive control on both upshift and downshift in the transmission. The upshift control sets the transmission for a faster drive or step-up to occur at or above a predetermined vehicle speed and the vehicle speed responsive control on transmission downshift, which is accompanied by ignition interruption, is such that when the vehicle is slowed down or brought to a temporary stop the transmission will be automatically stepped-down and thus be set for "break-away" acceleration in a favorable torque multiplying gear ratio. This invention relates to the hydraulic system, particularly the valving arrangement, employed to operate the servo-motor means which automatically causes the upshifts and downshifts referred to above.

In transmissions of the automatic or semi-automatic types, prior to this invention, servo-motor means of the pressure fluid type have been provided for power manipulative control of speed ratio changes. Such servo-motors often employ oil or the equivalent as the operating medium and are known generally as "hydraulically" operated transmissions. In arrangements of this type it has been customary to provide a complicated valve system for the control of the oil to the servo-motor and usually the valve system is itself operated by a motor such as a solenoid which lends itself to convenient control by a speed responsive governor, a kickdown switch, a dash switch, and other controls. In the past, valve systems of the type disclosed in the co-pending Iavelli et al. application, Serial No. 596,841, filed May 31, 1945, now Patent No. 2,490,592 dated December 6, 1949, or the Syrovy et al. application, Serial No. 596,842, filed May 31, 1945, now Patent No. 2,490,604 dated December 6, 1949, have been used to control the flow of oil to and from the hydraulically operated, speed responsive, shift cylinder which constitutes the servo-motor means. These valve systems usually include a series of slide valves such as a pilot valve, a main control valve, and a pressure relief valve with the attendant valve guides, springs, stops, and fluid passageways. It is obvious that such a valve control system is expensive to manufacture due to the large number of parts required and, furthermore, because of the large number of slidable parts, the danger of sticking parts is greatly increased, consequently the efficiency and reliability of such a system is endangered. It naturally follows that the cost of operation of such a system is liable to be expensive due to the large number of parts subject to wear and the increased possibilities for repair bills due to mechanical failures. I have discovered that slide valves are more susceptible to failure in a system of this type than flapper, plate, poppet, or ball type valves due partly to the possibilities of dirt or other solid particles, suspended in the fluid medium, becoming lodged between the slidably engaged valves and their adjacent surfaces so as to cause sticking of these contiguous slidable parts. Another reason for the failure of slide valves in a system of this type is the fact that slide valves generally have portions in sliding contact with their guideways and subject to sticking whether the valve is open or closed whereas a ball, plate, poppet or flapper valve is raised off its seat when the valve is opened and the flow of fluid across the opened valve and seat washes these surfaces clean so that a non-sticking seal may be maintained between these contiguous elements.

One object of this invention is to replace the complicated, multiple valve control systems of the type disclosed in the Iavelli at al. and Syrovy et al. applications with a simple, single valve system that will satisfactorily perform all the functions of the group of pilot, control and relief valves heretofore used in systems of this type. The single valve system is so designed that it is less noisy and less susceptible to mechanical failure than the multiple valve systems heretofore used with transmissions of this type.

Another object of this invention is to replace the multiple slide valve control system with a simple, single valve system adapted to operate in combination with a set of relief ports in the shift cylinder which arrangement is less susceptible to mechanical failure due to the use of a reliable ball, flapper, plate or poppet type valve instead of a set of slide valves which are frequently rendered inoperative due to the lodging of dirt particles, or the like, between the slidably engaged surfaces.

Another object of this invention is to provide a valve control means for the shift cylinder in which pressure relief ports in the shift cylinder operate as piston positioning elements as well as a means to prevent noise which might be caused by the shift cylinder piston being rammed against a rigid, metallic, piston positioning abutment.

Another object of my invention is to provide a simplified and improved control system for a transmission of the step-up and step-down type wherein ratio changes are produced by power shifts under control of the driver and in response to the speed of travel of the motor vehicle.

A further object is to provide an improved transmission operating system for control of positive interengageable drive control elements such that the tendency of the parts of the system to bind or fail to operate is obviated, due to the use of shift cylinder relief ports to restraining movement of the shift piston so as to prevent it being rammed against some rigid, piston positioning abutment means which might cause binding between the piston, shift rod and shift cylinder.

Further objects and advantages of my invention will be more apparent from the following illustrative embodiments, reference being had to the accompanying drawings, in which:

Fig. 3 is a diagrammatic view illustrating my control system, portions of the system being shown in sectional elevation;

Fig. 4 is an enlarged elevational view partly in section illustrating the solenoid-controlled valve shown in the Fig. 3 system in the upshifted position; and Fig. 5 is an enlarged elevational view partly in section of a modification of my invention which may likewise be adapted to the Fig. 3 system.

Figure 1:
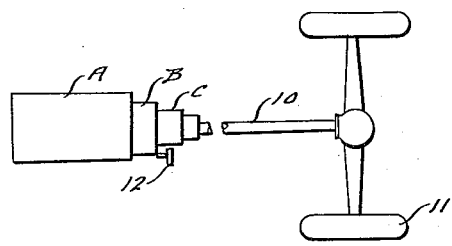
Fig. 1 is a diagrammatic top plan view of my power transmission applied to a motor vehicle.

In Fig. 1 the motor vehicle is of any desired type, that illustrated being of standard practice wherein an engine A transmits its drive through a transmission C and a propeller shaft 10 to drive the rear ground wheels 11. A fluid coupling and main friction clutch of known type may be provided within the housing B, the clutch being releasable to uncouple the engine from the transmission by a conventional clutch pedal 12. Rearwardly of housing B is the transmission C which is of any type incorporating positively engageable drive control elements which resist relative disengagement when under substantial torque load. Such an arrangement makes the use of some form of torque unloading means desirable, as an incident to transmission step-down, to insure release of the torque loaded drive control elements.

Figure 2:
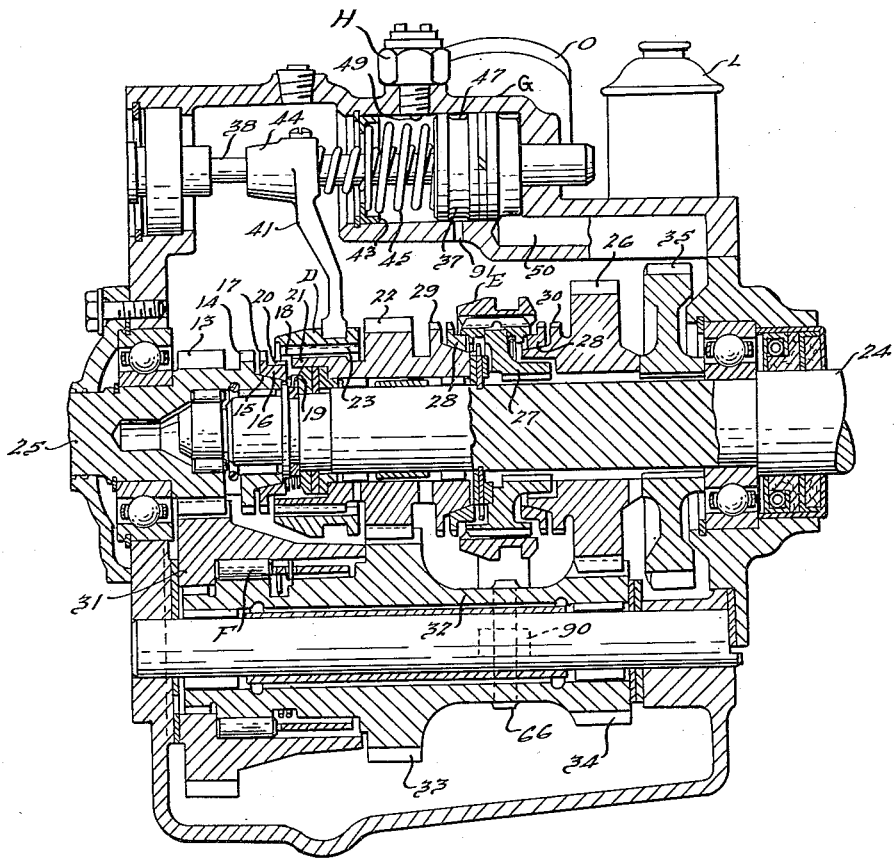
Fig. 2 is a sectional elevational view of a typical transmission to which my invention is applied for illustrative purposes.

The illustrated transmission C (see Fig. 2) is of the underdrive type although other types including overdrive transmissions of known commercial form may be employed if desired. This transmission C comprises an input pinion 13 carrying clutch teeth 14 and a friction cone 15 constantly engaged by a blocker 16 carrying blocker teeth 17 adapted to be engaged by the teeth 18 of a clutch sleeve D when the latter is biased forwardly under asynchronous conditions in the rotation of pinion 13 and sleeve D. This sleeve D together with clutch teeth 14 comprise relatively movable drive control elements for effecting step-up and step-down manipulation of the transmission.

Blocker 16 is lightly urged against the cone 15 by a spring 19 and has a lost-motion connection at 20 with the slotted end of a hub 21 of a high speed gear 22 this connection being such that the blocker 16 may move relative to sleeve D between two positions blocking the sleeve, such positions being known as drive block and coast block depending on whether pinion 13 appreciably leads or lags the speed of the sleeve. As the sleeve D is splined on hub 21 at 23, the arrangement is such that whenever sleeve D is rotating faster or slower than pinion 13 then the blocker teeth 17 will be aligned with the ends of the teeth 18 of sleeve D and thus prevent shift of the sleeve into driving contact with teeth 14. However, when the pinion 13 is rotating faster than sleeve D and gear 22, and the sleeve is biased forwardly by shift cylinder G into blocked position, the driver may release the accelerator pedal to cause the engine and pinion 13 to slow down and as the pinion and sleeve pass through a synchronous relationship the blocker is moved from its drive blocking position toward its coast blocking position and when mid-way will unblock the sleeve and allow teeth 18 to pass between the blocker teeth and clutch with teeth 14.

Gear 22 is loose on the output shaft 24 whereas pinion 13 is a part of the input shaft 25. Loose on the output shaft 24 is a low speed gear 26. A manually shiftable clutch E, which is adapted for axial shift, has a splined connection with a hub 27 fixed to shaft 24. Clutch E has associated therewith any commercial type of blocker synchronizers 28 such that clutch E may be shifted either forwardly to high range or rearwardly to low range to synchronously clutch shaft 24 either with the high speed gear 22 at the teeth 29 or with the low speed gear 26 at the teeth 30. Manual shifts of clutch E are facilitated by release of the main clutch at B by means of the usual clutch pedal 12.

Pinion 13 has constant mesh with a countershaft gear 31 operating through an overrunning clutch F to drive the countershaft cluster 32 comprising gears 33 and 34 respectively in constant mesh with gears 22 and 26. For reverse an idler gear (not shown) having constant mesh with gear 34 is shifted rearwardly to mesh with gear 35 fixed on shaft 24, clutch E being maintained in its illustrated neutral condition.

When clutch E is shifted rearward to clutch gear 26 to shaft 24 then an overrunning relatively slow speed low range drive or first speed is transmitted from shaft 25 to shaft 24 by way of gear 31, overrunning clutch F, and gears 34 and 26. If at such time sleeve D is biased forward into drive block condition and the shaft 25 allowed to coast down by overrunning release of clutch F, then when teeth 14 are thus synchronized with sleeve D the latter, as aforesaid, will be unblocked and will clutch with teeth 14 to effect a step-up in the transmission during coasting conditions so that now a two-way relatively fast speed low range drive or second speed is effected from shaft 25 through sleeve D to gear 22 thence by way of gears 33, 34, and 26 and through clutch E to shaft 24, clutch F overrunning.

If clutch E is shifted forwardly to clutch gear 22 to shaft 24 then an overrunning relatively slow speed high range drive or third speed is transmitted from shaft 25 to shaft 24 by way of gear 31, overrunning clutch F, gears 33 and 22 thence through clutch E to shaft 24. In the same manner as aforesaid in connection with step-up from first to second, sleeve D may be clutched under coast synchronous conditions with teeth 14 to effect a two-way relatively fast speed high range drive or direct fourth speed of a speed ratio of 1 to 1 from shaft 25 directly through sleeve D and clutch E to shaft 24, clutch F overrunning. All normal driving is usually started through the high range third speed gear ratio after which an automatic upshift to direct drive occurs.

A more complete description of the specific transmission described in this application, and its method of operation, is set forth in the Syrovy et al. application, Serial No. 596,842, filed May 31, 1945.

Speed responsive governor means O is provided to control forward bias of sleeve D as well as rearward bias thereof as will presently be more apparent. Furthermore, during drive in either second or fourth, a downshift to first or third respectively may be effected under control of the driver preferably by a full depression of the accelerator pedal M.

Referring now to Fig. 3, I have illustrated servo-motor means in the form of a fluid motor or shift cylinder G for controlling shift of sleeve D, this motor comprising a cylinder 36 slidably receiving a piston 37 which slidably receives a rod 38 which is mounted to reciprocate in the guideways 39, 40. Fixed to this rod is the collar 44 of a yoke 41 connected with sleeve D to effect shift thereof. A relatively small force pre-loaded engaging spring 42 is threaded on rod 38 and is disposed between piston 37 and yoke 41 to provide a lost-motion thrust transmitting connection such that piston 37 may move forwardly or to the left for its power stroke, being limited by relief ports 91 and abutment 43 in advance of the full clutching shift of sleeve D. On movement of piston 37 to the left the engaging spring 42 is compressed and this compressed spring then urges the yoke collar 44 towards the left so that the sleeve D is moved into engagement with blocker 16, and after coast, into engagement with teeth 14 of pinion 13. The yoke collar 44 abuts against the rear end of guideway 39 when the sleeve D has come to rest in its fully engaged upshifted position. A relatively large force pre-loaded kickdown spring 45 is disposed between abutment 43 and piston 37 and serves to return the piston 37 and sleeve D to the downshifted Fig. 3 position. The spring 45 is thus adapted to effect disengaging bias of sleeve D relative to teeth 14. It will be noted that as piston 37 moves toward the left end of cylinder 36, to accomplish up-shift engagement of sleeve D, ports 91 of cylinder 36 are uncovered so as to prevent engagement of piston 37 with abutment means 43. Ports 91 constitute relief ports to prevent pressure, in excess of that required to operate piston 37, building up in the hydraulic system. At the same time ports 91 serve as a piston positioning means and eliminate the need for additional piston abutment means. Ports 91 are uncovered just prior to engagement of piston 37 with abutment means 43, therefore, the pressure against the piston is automatically reduced and the piston 37 is not rammed against the abutment 43, accordingly, the noise that would be caused by such a contact of metallic parts 37 and 43 is eliminated. It is obvious that ports 91 also serve to properly position piston 37 in cylinder 36 so that sleeve D may be moved to its upshifted position through the combined action of the pressure fluid medium in cylinder 36 and the engaging spring 42. In addition to the above advantages, ports 91 prevent binding between the piston 37 and the shift rail 38 or the abutment means 43 as the pressure against the piston 37 has been relieved before the piston reaches abutment 43 and this retains the piston 37 free at the upshifted end of the cylinder 36 without forcing the piston against the abutment 43. Accordingly, the piston is free to immediately return to the downshifted position as soon as the cylinder 36 is vented of its pressure fluid.

Rod 38 has a shoulder 46 which in Fig. 3 engages the face of piston 37 but which, when the piston and rod 38 are moved to the upshifted end of their forward strokes, see Fig. 4, is spaced rearwardly of the piston to provide a gap 92 equal to the difference in length of the strokes of the piston and rod. This gap is utilized to close an ignition control switch H for interrupting the engine ignition system J. Piston 37 is provided with an annular groove 47 formed in its skirt portion to define the cam portion 48 which operates the ball actuator 49 for closing switch H.

The pressure fluid supply system has been diagrammatically represented in Fig. 3 and comprises a suitable supply 51 of oil which is usually at the transmission sump. A pump 52, preferably driven by the transmission output shaft 24, draws the oil from the supply 51 for delivery under pressure through pipe 53 thence to the passage 50 under control of a ball valve K. When the valve K is closed the oil is forced directly from the pump 52 through passages 53 and 50 to shift cylinder G where it moves the piston 37 and shift rod 38 to the left thus causing yoke 41 to shift sleeve D so as to cause an up-shift to second or fourth speed gear depending on whether clutch E is engaged with first speed gear 26 or third speed gear 22. Valve K is closed by the spring pressure of valve spring 56 and the pressure of the fluid medium when the solenoid L is de-energized and the solenoid plunger 54 is in its retracted position. When solenoid L is energized the solenoid plunger 54 is extended and ball valve K is opened by being forced downwardly off valve seat 55 so that oil now flows from the pump 52 through the line 53 to open valve K and back to the supply sump via return line 53a. The open valve K prevents sufficient pressure developing in line 50 to move piston 37 against the force exerted by piston retaining spring 45. It will be noted that the solenoid is energized only in first and third speeds and consequently in second and fourth speeds, where most of the actual driving time is accumulated, the solenoid is in a de-energized condition. This arrangement increases the life of the solenoid and accordingly renders the system more economical than one where the solenoid remains energized during the majority of the driving time.

In Fig. 3 the valve K is shown lowered to open position by operation of the solenoid L which is electrically energized to depress the valve against the force of the return spring 56 and to maintain the valve in such position. Fig. 4 shows the solenoid de-energized with the valve K in closed position and the cylinder piston 37 moved to upshifted position.

Energization and de-energization of solenoid L is brought about by operation from one position to another of either of two control members respectively actuated or controlled by vehicle speed and by the driver. Electrical circuit means for this purpose includes a grounded storage battery 57 for supply of electrical energy through ammeter 58 and ignition switch 59 to a wire 60 thence through line 88 and solenoid R of relay Q to a terminal 61 whence either of two parallel grounds 62 or 63 will complete a circuit. Energization of solenoid R closes connected contacts 83 and 84 against the tension of spring 86. On closing contact 84 electrical energy is supplied, via shunt connection through the contact 84, to the solenoid L and thence to ground at 81. In Fig. 3 the solenoid L is energized as a result of energization of the circuit, which grounds the terminal 61 through wire 64 at 62 through a closed governor switch N.

This governor switch N constitutes one of the two aforesaid control members for solenoid L and is opened at predetermined vehicle speeds under control of a governor O driven at 66 by some suitable gear means 90 which operates at a speed proportional to vehicle speed such as the transmission countershaft or the driven shaft 24, if desired.

The other parallel circuit for grounding terminal 61 at 63 is controlled by a kickdown switch P which is open in Fig. 3 as accelerator M is released under control of its return spring 66a. The accelerator M thus constitutes the other of the two aforesaid control members for solenoid L and is suitably connected by well known means with the usual engine carburetor throttle valve by linkage 67, 68 which serves to open and close the throttle valve. Interposed in the throttle valve operating linkage 67, 68 is a lever 70 pivotally supported at 71 and having spaced fingers 72, 73 for operating the switch finger 74 of the snap-type of switch P. The arrangement is such that as the throttle valve approaches its wide open position by depressing accelerator M, finger 73 is engaged with switch finger 74 so that switch P is closed with snap action during approximately the last 5° or so of throttle opening movement.

If desired a pick-up spring 75 may be located at a suitable point in the throttle operating mechanism such that it imposes a yielding load on the accelerator pedal M, in addition to the return spring 66a, at the time when the pedal moves to close switch P. The driver thus will not accidentally close switch P at the end of the pedal stroke as a noticeable additional effort is required to depress the accelerator to bring the knickdown switch P into operation. When the accelerator is then released the finger 72 operates to open the switch P near the fully released position of the accelerator The parts are so arranged that switch P will be opened by finger 72 whenever the accelerator pedal is fully released.

The ignition system J is conventional and includes coil 76, distributer 77, and breaker 78. From the primary side of the coil it is possible to set up an ignition grounding line that extends by wires 79 and 87 through the closed contact 83 to the interrupter switch H thence to ground at 82.

In operation with the parts arranged as in Fig. 3 the vehicle is at a standstill with the ignition on and the engine is idling. With transmission C in neutral and the vehicle at standstill the governor switch N is closed thus effecting energization of solenoid R which closes contacts 83 and 84 and supplies current for the energization of solenoid L which opens valve K to vent hydraulic motor G and maintains sleeve D released as shown. Interrupter switch H is open as the ball actuator 49 is free of the piston 37. Kickdown switch P is open as the accelerator pedal is released.

For an ordinary forward drive, the operator shifts the sleeve E forwardly to engage third speed gear 22 for driving in high range and by depressing the accelerator pedal the vehicle is driven in third up to any desired speed. At some predetermined speed of vehicle travel, as at 6–7 miles per hour in first speed or around 12–14 miles per hour in third speed, or higher or lower as desired, governor O operates to open switch N. This de-energizes solenoid R and opens contacts 83 and 84 and this de-energizes solenoid L whereupon valve K is closed by operation of the spring 56 and this closes off pressure fluid return pipe 53a so as to cause pressure to build up in passage 50. Piston 37 then moves forwardly for its upshift stroke until relief ports 91 are uncovered and the fluid pressure is relieved. This forward movement of piston 37 compresses springs 45 and 42 and momentarily closes switch H which, however, does not interrupt the ignition because switches N and P are open as are the contacts 83 and 84 which breaks the circuit through the interrupter switch H. When the piston 37 is at the end of its forward stroke switch H is also open as the ball 49 is then aligned with the piston groove 47.

When piston 37 moves forwardly spring 42 operates to move rod 38 and sleeve D forwardly only until sleeve D comes up to its drive blocked position where it remains until the vehicle driver releases the accelerator pedal for the upshift to fourth by allowing the engine to slow down sufficiently to synchronize the speeds of teeth 14 and sleeve D and to effect unblocking action of the blocker 16. The upshift is then completed and the drive then is in the cruising fourth or direct drive.

When the governor O operates to open switch N it is apparent that this de-energizes the relay solenoid R which permits spring 86 to open contacts 83 and 84 so that the solenoid L is then de-energized and the valve K closed so that pressure fluid is pumped directly from the pump 52 to the shift cylinder G where the piston 37 will be moved forward to shift sleeve D into engagement with teeth 14 of pinion 13 and thus accomplish the upshift to fourth speed.

Downshift from fourth speed back to third speed is effected either by manually closing the kickdown switch P or by the automatic closing of governor switch N. Thus when the driver desires to manually effect the downshift from fourth speed he fully depresses the accelerator M to close switch P and inasmuch as the engine is delivering its full power at the attendant wide open throttle, it is desired to effect torque relief at the teeth 14, 18 to facilitate the release of sleeve D for the downshift. Therefore, when switch P is closed this not only energizes relay solenoid R which closes contacts 83 and 84 but it also energizes solenoid L to vent motor G. Closing of contacts 83 and 84 coincidentally affords a circuit through contact 83 and through interrupter switch H for grounding at 82 when switch H is closed by the rearward movement of piston 37. When motor G is vented, piston 37 moves rearwardly a small amount independently of sleeve D under the force of spring 45 in taking up the aforesaid gap 92 until the piston engages the rod shoulder 46. When the piston moves to take up the gap 92, cam 48 engages switch actuator 49 and closes the switch H thereby completing the grounding circuit at 82 so as to interrupt the ignition system. This instantly unloads the torque load between teeth 14 and the teeth of sleeve D and permits disengagement of sleeve D and teeth 14 of pinion 13 whereupon the piston 37 completes its rearward or return stroke back to the downshifted Fig. 3 position, moving with it, because of shoulder 46, the rod 38 and sleeve D as a unit. As soon as the sleeve D clears the teeth 14 the ignition is restored to normal operation because ball 49 clears the cam 48 and opens switch H. When the accelerator M is later released then fourth speed is again restored as aforesaid provided the vehicle speed is still such that switch N is open.

For the automatic downshift from fourth to third under control of the vehicle speed governor O, it is only necessary to reduce the vehicle speed to or below the speed at which governor switch N closes. This energizes relay solenoid R which closes contacts 83 and 84 and causes energization of solenoid L whereupon motor G effects the downshift just as outlined in connection with the closing of kickdown switch P.

When the clutch E is in its rearward low range position, then the upshift and downshift under control of sleeve D will be just as set forth in connection with the corresponding functions occurring for the high range setting. However, if governor O is driven from the countershaft, as at 66 in Fig. 2, then the governor O will function at somewhat lower car speeds depending on the gear ratios for first and second compared with third and fourth as will be readily understood.

In Fig. 5, I have illustrated a modification of the combination control and relief valve shown in Fig. 4. The solenoid L has a plunger rod 94 with an enlarged outer end portion which constitutes a stemmed plate valve T. When the solenoid L is energized, as when driving in first or third speed below the car speed at which switch N opens, then plunger rod 94 is moved downwardly by solenoid L and plate valve T is lowered off valve seat 95 so as to allow the oil to flow from the pump 52 through the valve T and back to the supply sump via return line 53a. With the valve T in its open position sufficient pressure cannot be developed at the hydraulic shift cylinder G to move the piston 37 from its low speed position at the right side of the cylinder. When the solenoid L is de-energized as when driving in first or third speed above the car speed at which switch N opens or when driving in second or fourth speed, then plunger 94 is in its retracted position with plate valve T held closed against valve seat 95 by the pressure of the oil so as to restrain escape of oil through the valve T, thus forming a closed system which builds up pressure at the shift cylinder G and moves piston 37 towards the left end of the cylinder G. This movement of piston 37 causes yoke 41 to shift direct speed clutch sleeve D into engagement with the teeth 17 of blocker 16 and, after the coast as aforesaid, sleeve D then moves to engage teeth 14 of pinion 13 and driving in second or fourth gear is accomplished. In addition to the plunger rod 94, guide pins of any well known type may be used to slidably mount valve T on valve seat 95. It will be noted that with this embodiment the valve spring 56 is eliminated and a positive control system is provided with a minimum of parts. The solenoid L in both modifications of the invention includes a conventional plunger rod return spring (not shown) to hold the plunger rod in its retracted position when the solenoid is de-energized. Such a system, as shown in Fig. 5 is most economical to manufacture and has fewer parts to cause mechanical failure.

It is apparent that in Figs. 4 and 5 of the drawings I have disclosed embodiments of my invention each of which provide a simplified, positive, single valve, control means for a hydraulically operated shift cylinder or servo-motor means for a transmission.

While I have illustrated and described but two embodiments of my invention, it is to be understood that such are for purposes of illustration only, and it is contemplated that those skilled in the art may modify certain details without departing from the spirit or scope of the invention as defined in the claims appended hereto.

I claim:

1. In a control system for a motor vehicle transmission, a pressure fluid operated device for controlling speed ratio changes in said transmission comprising a shift cylinder, a piston reciprocably mounted in said cylinder, and a port in said cylinder adapted to be uncovered when said piston has been moved to a predetermined position, a source of pressure fluid, conduit means for conducting pressure fluid from said source to said cylinder, fluid by-pass means branching off from said conduit means comprising a valve casing having a passage therethrough providing a ported valve seat, a control valve adapted to be mounted on said ported valve seat, means yieldably urging said valve on said valve seat, said valve when seated closing off said branching by-pass means, and solenoid operated means adapted to unseat said valve and connect said conduit means to said by-pass means, said port in said cylinder being adapted to function as a pressure fluid relief valve and as a piston positioning means when said control valve is seated.

2. In a control system for a motor vehicle transmission, a pressure fluid operated device for controlling speed ratio changes in said transmission comprising a shift cylinder, a piston reciprocably mounted in said cylinder, and a port in said cylinder adapted to be uncovered when said piston has been moved to a predetermined position, a source of pressure fluid, conduit means for conducting pressure fluid from said source to said cylinder, fluid by-pass means branching off from said conduit means comprising a valve casing having a passage therethrough providing a ported valve seat, a ball-type control valve adapted to be mounted on said ported valve seat, means yieldably urging said valve on said valve seat, said valve when seated closing off said branching by-pass means, and solenoid operated means adapted to unseat said valve and connect said conduit means to said by-pass means, said port in said cylinder being adapted to function as a pressure fluid relief valve and as a piston positioning means when said control valve is seated.

3. In a control system for a motor vehicle transmission, a pressure fluid operated device for controlling speed ratio changes in said transmission comprising a shift cylinder, a piston reciprocably mounted in said cylinder, and a port in said cylinder adapted to be uncovered when said piston has been moved to a predetermined position, a source of pressure fluid, conduit means for conducting pressure fluid from said source to said cylinder, fluid by-pass means branching off from said conduit means comprising a valve casing having a passage therethrough providing a ported valve seat, a control valve adapted to be mounted on said valve seat, means holding said valve on said valve seat, said valve when seated being adapted to close off said branching by-pass means, and electrically operated means adapted to unseat said valve to open said conduit means to said by-pass means, said port in said cylinder being adapted to function as a pressure fluid relief valve and as a piston positioning means when said valve is seated.

4. In a control system for a motor vehicle transmission, a pressure fluid operated device for controlling speed ratio changes in said transmission comprising a shift cylinder, a piston reciprocably mounted in said cylinder, and a port in said cylinder adapted to be uncovered when said piston has been moved to a predetermined position, a source of pressure fluid, conduit means for conducting pressure fluid from said source to said cylinder, fluid by-pass means branching off from said conduit means comprising a valve casing having a passage therethrough providing a ported valve seat, a plate type control valve adapted to be mounted on said valve seat, means holding said valve on said valve seat, said valve when seated being adapted to close off said branching by-pass means, and electrically operated means adapted to unseat said valve to open said conduit means to said by-pass means, said port in said cylinder being adapted to function as a pressure fluid relief valve and as a piston positioning means when said valve is seated.

5. In a control system for a motor vehicle transmission, a pressure fluid operated device for controlling speed ratio changes in said transmission comprising a shift cylinder, a piston reciprocably mounted in said cylinder, and a port in said cylinder adapted to be uncovered when said piston has been moved to a predetermined position, a source of pressure fluid, conduit means for conducting pressure fluid from said source to said cylinder, fluid by-pass means branching off from said conduit means comprising a valve casing having a passage therethrough providing a ported valve seat, a control valve adapted to be seated on said valve seat, means yieldably holding said valve in said valve seat port, said valve when seated closing off said branching by-pass means from said conduit means, electrically operated means adapted to unseat said valve, vehicle speed responsive means to control energization of said electrically operated means, and manually operated means adapted to overrule said vehicle speed responsive means to accomplish a de-energization of said electrically operated means, said port in said cylinder being adapted to function as a pressure fluid relief valve and as a piston positioning means when said control valve is seated.

6. A control system adapted to actuate a piston in the cylinder of a pressure fluid operated motor, comprising a fluid supply, a pump operable to deliver fluid under pressure from said supply to the cylinder of said motor, conduit means for conducting pressure fluid between said pump and said motor, a by-pass passageway adapted to communicate with said pressure fluid conduit means adapted to deliver said pressure fluid back to said supply, valving means operably associated with said by-pass passageway for controlling the flow of pressure fluid through said passageway, said valving means thereby controlling the delivery of pressure fluid from said pump to said motor so as to selectively effect operation of and venting of said motor, said by-pass passageway valving means including a valve seat formed with a valve port, a ball-type control valve adapted to be seated on said valve port to close off said passageway from said conduit means, means yieldably holding said valve on said seat, solenoid actuated means adapted to unseat said valve to thereby open said pressure fluid conduit means to said fluid supply through said by-pass passageway, and a port in the cylinder of said motor adapted to be uncovered by a predetermined movement of said piston, said port in the cylinder being adapted to function as a relief valve and a piston positioning means when said ball-type control valve is seated.

7. A control system adapted to actuate a piston in a cylinder of a pressure fluid operated motor, comprising a fluid supply, a pump operable to deliver fluid under pressure from said supply to said cylinder of said motor, conduit means for conducting pressure fluid between said pump and said motor, a by-pass passageway extending between said conduit means and said fluid supply adapted to deliver said pressure fluid back to said supply, valving means operably associated with said by-pass passageway for controlling the flow of pressure fluid through said by-pass passageway, said valving means thereby controlling the delivery of pressure fluid from said pump to said motor so as to selectively effect operation of and venting of said motor, said by-pass passageway valving means comprising a valve casing having a first passageway adapted to be connected between said pump and said conduit means and a second passageway connected with said first passageway and adapted to be connected to said fluid supply, a valve seat formed in said second passageway, a control valve mounted in said first passageway adapted to engage said seat to close off communication between said first and second passageways, resilient means urging said valve into engagement with said seat, and a solenoid unit including a reciprocable plunger bar mounted on said casing, said plunger bar being adapted to be moved into engagement with said valve upon energization of said solenoid unit to unseat said valve and open said first passageway to said second passageway.

8. In a power transmission for a motor vehicle, means for effecting change in the speed ratio drive through said transmission comprising a pressure fluid operated motor, a fluid supply, a pump operable to deliver fluid under pressure from said supply to said motor, pressure fluid conduit means connected between said pump and said motor, said motor including a cylinder and a resiliently supported piston operably disposed therein, said cylinder having a valve port in its wall adapted to be uncovered by said piston when said piston is moved by pressure fluid in said cylinder to a predetermined position whereby said port functions to limit the movement of said piston and to operate as a pressure fluid relief valve, a by-pass passageway adapted to connect said conduit means with said supply so as to deliver pressure fluid back to said supply, and a control valve unit operably associated with said passageway for controlling the flow of pressure fluid through said passageway and to said motor to selectively effect fluid operation of and venting of said motor, said valve unit comprising a valve seat in said passageway, a ball valve in said passageway adapted to engage said seat to close off said passageway from said conduit means, resilient means urging said valve on said seat, and solenoid actuated means adapted to unseat said valve.

9. In a power transmission for a motor vehicle, means for effecting change in the speed ratio drive through said transmission comprising a pressure fluid operated motor, a fluid supply, a pump operable to deliver fluid under pressure from said supply to said motor, pressure fluid conduit means connected between said pump and said motor, said motor including a cylinder and a spring supported piston operably disposed therein, said cylinder having a valve port in its wall adapted to be uncovered when said piston is moved by pressure fluid in said cylinder to a predetermined position whereby said port functions to limit the movement of said piston and to operate as a relief valve for the pressure fluid entrapped in said conduit means, a by-pass passageway adapted to connect said conduit means with said supply so as to deliver pressure fluid back to said supply, a solenoid actuated valve operably associated with said passageway for controlling the flow of fluid through said passageway and to thereby control the delivery of pressure fluid from said pump to said motor to selectively effect fluid operation of and venting of said motor, and means operable to control actuation of said valve.

10. In a hydraulic control system, a control valve comprising a casing, a first passageway extending therethrough adapted to be connected between a pressure fluid source and a fluid actuated device, a second passageway intersecting said first passageway and adapted to connect said pressure fluid source to a fluid supply, a valve seat at the intersection of said passageways, a ball valve in one of said passageways adapted to engage said seat to close off communication between said passageways, resilient means urging said valve on said seat, a solenoid unit mounted on said casing including a solenoid actuated plunger bar adapted to be moved into engagement with said valve to unseat said valve.

11. In a control system for a motor vehicle transmission, a pressure fluid and spring operated servo motor for effecting speed ratio changes in said transmission, said motor including a cylinder with a shiftable piston therein, a shiftable control element operably connected between said transmission and said piston and adapted to be moved by said piston from a first position to a second position by the admission of pressure fluid to said cylinder, said motor including spring means biasing said piston and shiftable for movement from said second position to said first position, a source of pressure fluid, conduit means for conducting the pressurized fluid from said source to said motor to effect movement of said piston and shiftable control element from said first position to said second position, a bypass conduit connected to said conduit means between said source and said motor to provide means for the venting of the pressure fluid from said motor and said conduit means, said bypass conduit including a valve unit having a bore therethrough provided with a valve seat, a valve adapted to be seated on said seat to close off the vent through said bypass conduit, resilient means yieldably urging said valve against said seat, electrically energizable means operable to unseat said valve to vent the pressure fluid from said motor and said conduit means to provide for movement of said shiftable control element by said spring actuating means from said second position to said first position to effect a change in the speed ratio drive transmitted by said transmission and a pressure fluid relief port formed in the servo motor cylinder adapted to limit the pressure of the fluid in the conduit means and the motor irrespective of the position of said valve.

12. In a control system for a motor vehicle transmission, a pressure fluid and spring operated servo motor for effecting speed ratio changes in said transmission, said motor including a cylinder with a shiftable piston therein, a shiftable control element operably connected between said transmission and said piston and adapted to be moved by said piston from a first position to a second position by the admission of pressure fluid to said cylinder, said motor including spring means biasing said piston and shiftable control element for movement from said second position to said first position, a source of pressure fluid, conduit means for conducting the pressurized fluid from said source to said motor to effect movement of said piston and shiftable control element from said first position to said second position, a bypass conduit connected to said conduit means between said source and said motor to provide means for the venting of the pressure fluid from said motor and said conduit means, said bypass conduit including a valve unit having a bore therethrough provided with a valve seat, a valve adapted to be seated on said seat to close off the vent through said bypass conduit, resilient means yieldably urging said valve against said seat, solenoid controlled means operable to unseat said valve to vent the pressure fluid from said motor and said conduit means to provide for movement of said shiftable control element by said spring actuating means from said second position to said first position to effect a change in the speed ratio drive transmitted by said transmission, and a pressure fluid relief valve associated with the servo motor and operated by said shiftable piston adapted to limit the pressure of the fluid in the conduit means and motor irrespective of the position of said first mentioned valve, said pressure fluid relief valve providing a means to properly locate the shiftable piston in the aforesaid second position.

13. In a control system for a motor vehicle transmission, a pressure fluid and spring operated servo motor for effecting speed ratio changes in said transmission, said motor including a cylinder with a shiftable piston therein, a shiftable control element operably connected between said transmission and said piston and adapted to be moved by said piston from a first position to a second position by the admission of pressure fluid to said cylinder, said motor including spring means biasing said piston and shiftable control element for movement from said second position to said first position, a source of pressure fluid, conduit means for conducting the pressurized fluid from said source to said motor to effect movement of said piston and shiftable control element from said first position to said second position, a bypass conduit connected to said conduit means between said source and said motor to provide means for the venting of the pressure fluid from said motor and said conduit means, said bypass conduit including a valve unit having a bore therethrough provided with a valve seat, a valve adapted to be seated on said seat to close off the vent through said bypass conduit, resilient means yieldably urging said valve against said seat, electrically operated means to unseat said valve, a plurality of controls for said electrically operated means to effect unseating of said valve to vent the pressure fluid from said motor and said conduit means and provide for movement of said shiftable control element by said spring actuating means from said second position to said first position to effect a change in the speed ratio drive transmitted by said transmission, and a pressure fluid relief port in said cylinder and operably associated with said piston adapted to limit the pressure of the fluid in the conduit means and the motor irrespective of the position of said valve.

14. In a control system for a motor vehicle transmission, a pressure fluid operated servo motor for effecting speed ratio changes in said transmission, said motor including a cylinder with a shiftable piston therein, a shiftable control element operably connected between said transmission and said piston and adapted to be moved by admission of pressure fluid to said motor from a first position to a second position to effect a change in the speed ratio drive transmitted by said transmission, said motor including means normally urging said piston from said second position to said first position, a source of pressure fluid, conduit means for conducting the pressurized fluid from said source to said motor to provide means for effecting movement of said piston from said first position to said second position to thereby cause a change in the speed ratio drive transmitted by said transmission, a first vent port associated with said conduit means and arranged between said source and said motor to provide means for the venting of the pressure fluid from said motor and said conduit means, said first vent port having associated therewith a valve unit provided with a valve seat, a valve adapted to be seated on said seat to close said first vent port and direct the pressure fluid into said motor cylinder, resilient means yieldably biasing said valve against said seat to close said first vent port, means operable to unseat said valve to vent the pressure fluid from said motor cylinder and conduit means so as to provide for movement of said piston and shiftable control element from said second position to said first position to effect a change in the speed ratio drive transmitted by said transmission, and a second vent port in said cylinder and arranged to cooperate with said shiftable piston to relieve the pressure of the fluid directed into said motor cylinder after said motor piston has moved said shiftable control element a predetermined portion of the distance between said first position and said second position.

15. In a control system for a motor vehicle transmission, a pressure fluid operated servo motor for effecting speed ratio changes in said transmission, said motor including a cylinder with a shiftable piston therein, a shiftable control element operably connected between said transmission and said piston and adapted to be moved by admission of pressure fluid to said motor from a first position to a second position to effect a change in the speed ratio drive transmitted by said transmission, said motor including means normally urging said piston from said second position to said first position, a source of pressure fluid, conduit means for conducting the pressurized fluid from said source to said motor to provide means for effecting movement of said piston from said first position to said second position to thereby cause a change in the speed ratio drive transmitted by said transmission, a first vent port associated with said conduit means and arranged between said source and said motor to provide means for the venting of the pressure fluid from said motor and said conduit means, said first vent port having associated therewith a valve unit provided with a valve seat, a valve adapted to be seated on said seat to close said first vent port and direct the pressure fluid into said motor cylinder, resilient means yieldably biasing said valve against said seat to close said first vent port, solenoid means operable to unseat said valve to vent the pressure fluid from said motor cylinder and conduit means so as to provide for movement of said piston and shiftable control element from said second position to said first position to effect a change in the speed ratio drive transmitted by said transmission, and a second vent port in said motor cylinder operably associated with said piston to relieve the pressure of the fluid directed into said motor cylinder after said motor has moved said shiftable control element a predetermined portion of the distance between said first position and said second position, said second vent port providing a pressure fluid relief valve and a positioning means for said shiftable control element when said first vent port is closed.

WILLIAM A. HUNTER.

REFERENCES CITED

The following references are of record in the file of this patent:

UNITED STATES PATENTS

| Number | Name | Date |
|---|---|---|
| 1,819,452 | Wright | Aug. 18, 1931 |
| 2,296,646 | Matulaitis | Sept. 22, 1942 |
| 2,342,960 | Neracher et al. | Feb. 29, 1944 |
| 2,404,514 | McClure | July 23, 1946 |